(12) United States Patent
Hu et al.

(10) Patent No.: US 12,025,488 B2
(45) Date of Patent: Jul. 2, 2024

(54) TWO STAGE PROCESSING DISTRIBUTED FIBER OPTIC SENSING (DFOS) INTERROGATOR FOR ACOUSTIC MODULATED SIGNALS

(71) Applicant: NEC Laboratories America, Inc., Princeton, NJ (US)

(72) Inventors: Junqiang Hu, Davis, CA (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 18/126,409

(22) Filed: Mar. 25, 2023

(65) Prior Publication Data

US 2023/0228617 A1    Jul. 20, 2023

Related U.S. Application Data

(63) Continuation of application No. 17/225,013, filed on Apr. 7, 2021, now abandoned.

(60) Provisional application No. 63/006,806, filed on Apr. 8, 2020.

(51) Int. Cl.
    *G01H 9/00*     (2006.01)
    *G01K 11/32*    (2021.01)
    *G01L 1/24*     (2006.01)

(52) U.S. Cl.
    CPC ............ *G01H 9/004* (2013.01); *G01K 11/32* (2013.01); *G01L 1/242* (2013.01)

(58) Field of Classification Search
    CPC ......... G01H 9/004; G01K 11/32; G01L 1/242
    See application file for complete search history.

(56) References Cited

U.S. PATENT DOCUMENTS

| | | | |
|---|---|---|---|
| 2012/0188533 A1* | 7/2012 | Crickmore | G01D 5/35303 356/73.1 |
| 2014/0078506 A1* | 3/2014 | Hu | G01M 11/3118 356/445 |
| 2015/0377738 A1* | 12/2015 | Dorfman | G01D 5/35367 356/73.1 |
| 2019/0025094 A1* | 1/2019 | Lewis | G01D 5/35361 |
| 2020/0136722 A1* | 4/2020 | Urban | H04B 10/0779 |

* cited by examiner

*Primary Examiner* — Dominic J Bologna
(74) *Attorney, Agent, or Firm* — Joseph Kolodka (57) ABSTRACT

Distributed fiber optic sensing systems (DFOS) methods, and structures that employ DVS/DAS point sensors and a two-stage processing methodology/structure that advantageously enable point sensors to send sensor data at any time—thereby providing significant processing advantages over the prior art.

3 Claims, 8 Drawing Sheets

FIG. 1

Prior Art

FIG. 2

Prior Art

TWO STAGE PROCESSING DISTRIBUTED FIBER OPTIC SENSING (DFOS) INTERROGATOR FOR ACOUSTIC MODULATED SIGNALS

CROSS REFERENCE

This disclosure claims the benefit of U.S. patent application Ser. No. 17/225,013 filed 7 Apr. 2021 which claimed the benefit of U.S. Provisional Patent Application Ser. No. 63/006,806 filed 8 Apr. 2020 the entire contents of each is incorporated by reference as if set forth at length herein.

TECHNICAL FIELD

This disclosure relates generally to distributed fiber optic sensing (DFOS) systems, methods, and structures. More particularly, it pertains to a two stage processing DFOS interrogator for acoustic modulated signals.

BACKGROUND

Distributed fiber optic sensing systems, methods, and structures that employ distributed vibration sensing (DVS)/distributed acoustic sensing (DAS) point sensors have shown great promise and numerous benefits in a variety of contemporary applications. Such systems, however, generally require that the point sensor(s) send sensor data at a fixed interval or require an interrogator to continuously collect and process data from each point sensor employed in the system.

SUMMARY

The above problem is solved and an advance in the art is made according to aspects of the present disclosure directed to distributed fiber optic sensing systems (DFOS) methods, and structures that employ DVS/DAS point sensors. In sharp contrast to the prior art, systems, methods, and structures according to aspects of the present disclosure advantageously enable such point sensors to send sensor data at any time—thereby providing significant processing advantages over the prior art.

As such, systems, methods, and structures according to the present disclosure represent a significant advance in the art inasmuch as the interrogator is able to detect "abstracted" vibration data/signals in addition to any original (per-sample) signal(s) from point sensors—each located at a different point along the fiber. As used herein, "Abstract" refers to the processed result from the original signal, which may include low and/or high pass filters, power accumulation, etc., to suppress noise while strengthen the active signal. This result is considered as a "vibration", which has much lower rate than the original signal, to reduce software processing complexity while providing all the necessary information.

In one illustrative embodiment, systems, methods, and structures according to aspects of the present disclosure employ a two stage operation in the transmitter—which may be part of the point sensor—to send data, namely 1) an alarm stage and 2) a data sending stage.

In the alarm stage, the transmitter sends a short signal that triggers the interrogator to switch from a vibration detection mode into a per-sample detection and demodulation mode. In the data sending stage, the transmitter modulates sensory data into vibration/acoustic signal. Correspondingly, for each point sensor, the interrogator will include two states, a vibration detection state, and a demodulation state.

It operates in the vibration detection state when there is no activity by a point sensor, which is generally equivalent to processing other fiber locations that do not have associated point sensors. Once a vibration is detected (which is from a point sensor's "alarm" signal), it switches operation to demodulation stage, processes the signal sample-by-sample, and recovers original data. Between the alarm stage and the data sending stage, the transmitter waits a pre-set. fixed interval of time, which is the interrogator's maximum switching latency. The alarm signal uses a pattern (such as a specific frequency, or a pattern of sequence) that is believed most effective for vibration detection, while the data signal is tuned—in consideration of the trade-off between modulation efficiency and correctness of data as received at the receiver.

In one illustrative embodiment according to aspects of the present disclosure, the transmitter has no alarm stage, and it can send data signals whenever needed. For each point sensor, the interrogator has a loop buffer that continuously receives data. The data received from each point sensor is handled in two process paths: a vibration detection path and a buffering path. The vibration detection path follows the same procedure as other locations. At the same time, it is written into a corresponding loop buffer, with earlier received in time samples being replaced with newer, later received in time ones. When vibration is detected from a point sensor, the interrogator extracts data from its loop buffer and performs demodulation to recover any signals. In a property configured system, the buffer is sized large enough to compensate for any vibration detecting latency.

According to certain aspects of the present disclosure, systems, methods, and structures according to the present disclosure employ "coarse processing" and "fine processing" in the interrogator. As we use the terms herein, "coarse processing" refers to vibration detection—a feature of a DVS/DAS that is usually performed by dedicated logic such as FPGA (Field Programmable Gate Array) firmware or an ASIC (Application Specific Integrated Circuit)—resulting in an "abstracted" output that exhibits a much smaller data volume than provided by the prior art methods. As further used herein, "fine processing" is signal demodulation, using either firmware/ASIC or software—with output data containing the detailed information. Demodulation is only performed when vibration(s) are detected—thereby reducing required processing resources and/or processing complexity. As those skilled in the art will understand and appreciate by our disclosure, our two level approach allows for a software demodulation, which is advantageously and surprisingly more cost effective and flexible for future upgrades.

Finally, according to aspects of the present disclosure—from the point of view of a point sensor—the point sensor may send data whenever needed, rather than using dedicated time slot—and not when it is not needed. In an illustrative embodiment according to an aspect of the present disclosure wherein a point sensor is a hazard detection sensor, It actively monitors for hazardous conditions and immediately report only upon detection of such hazard, otherwise the data transmission function is disabled—thereby conserving power.

BRIEF DESCRIPTION OF THE DRAWING

A more complete understanding of the present disclosure may be realized by reference to the accompanying drawing in which.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

Previously, we reported a uni-directional signal transmit method using distributed fiber sensing in which we disclosed a DOFS system using DVS/DAS point-sensors that conveyed sensor data to an interrogator via its attached sensor fiber. As we noted, such an inventive arrangement enabled the collection of point-sensor data from locations tens of miles away from the interrogator while avoiding use of a communication network. Subsequently, we disclosed using frequency modulation for unidirectional signal transmission through distributed vibration or acoustic sensing wherein we employed frequency-modulation in the point-sensor to encode data sent to the interrogator. As noted previously however, such data needed to be sent at fixed intervals—or require the interrogator to continuously collecting and processing the data sent from each point sensor.

Those skilled in the art will understand and appreciate that this method of sending (from point-sensor's point of view) point sensor data at fixed intervals cannot be used in applications that may—for example—send an alarm out of a regular time slot. Such method also requires a synchronization scheme to compensate clock skew that arises between the point sensor and the interrogator. And since the interrogator must receive and process data continuously, there is significant processing overhead and power required—especially in configurations having a large number of individual point sensors.

Advantageously—and in sharp contrast—systems, methods, and structures according to aspects of the present disclosure enable point sensors to send data to an interrogator at any time—using substantially less processing power as compared to the prior art systems and methods.

By way of some additional background, we note that distributed fiber optic sensing (DFOS) is an important and widely used technology to detect environmental conditions (such as temperature, vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

Those skilled in the art will understand and appreciate that by implementing a signal coding on the interrogation signal enables the sending of more optical power into the fiber which can advantageously improve signal-to-noise ration (SNR) of Rayleigh-scattering based system (e.g. distributed acoustic sensing or DAS) and Brillouin-scattering based system (e.g. Brillouin optical time domain reflectometry or BOTDR).

Figure 1:
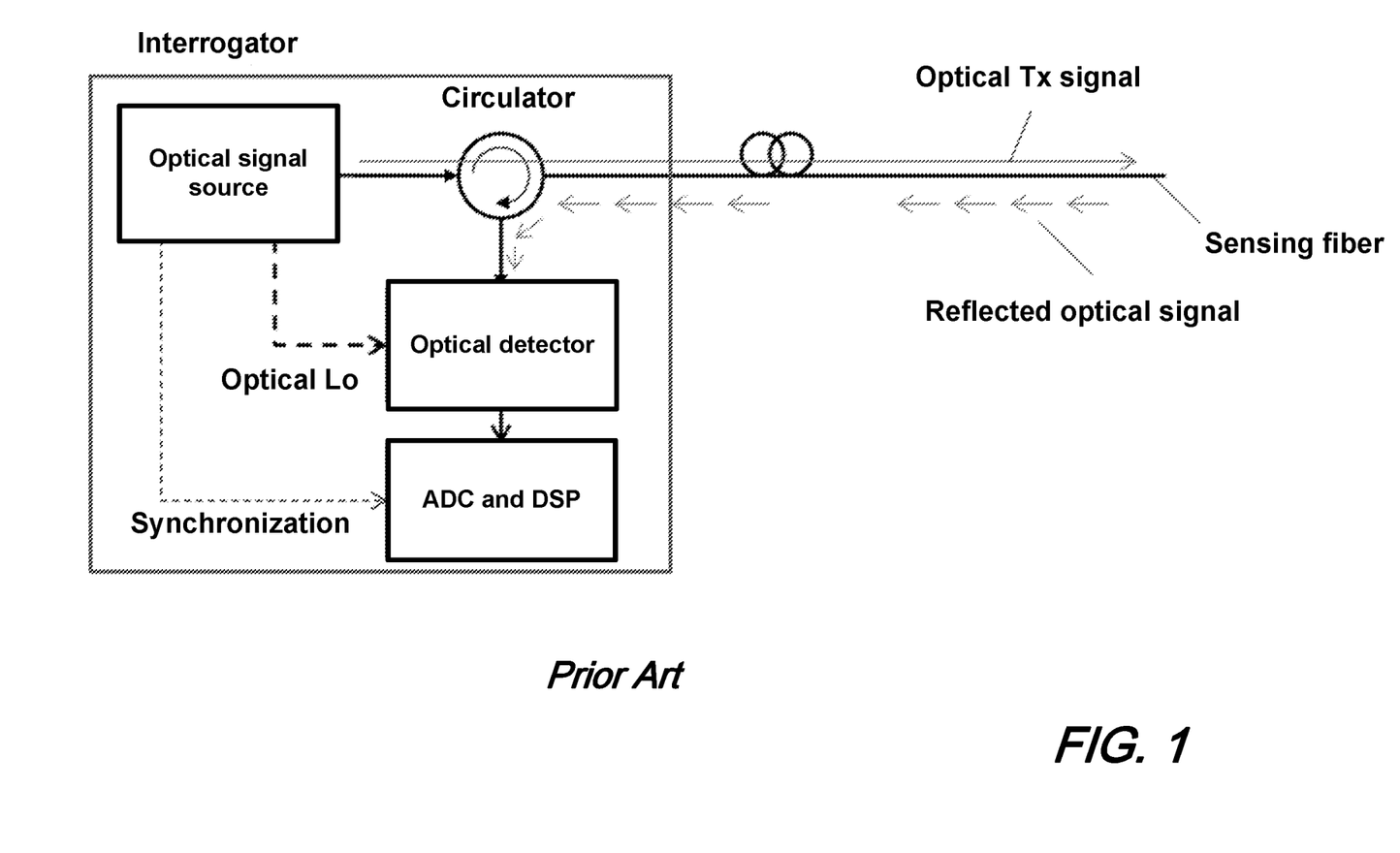
FIG. 1 is a schematic diagram illustrating a prior art distributed fiber optic sensor system (DFOS)

FIG. 1 is a schematic diagram illustrating a prior art distributed fiber optic sensor system (DFOS). As may be observed from this figure, the interrogator includes an optical signal source that may further include a laser, electrical signal generator, a modulator, amplifier(s); a circulator that directs source signals to a sensing fiber and returned, backscattered light to an optical detector; a fiber link conveys backscattered light including environmental information; an optical detector that may include photo diode, amplifier(s), to convert reflected optical signal to electrical domain; analog-to-digital converter(s) (ADC) and digital signal processor(s) (DSP) to convert a detected analog signal to the digital domain and perform digital signal processing to decode sensed data and resulting information.

As those skilled in the art will appreciate, the source interrogation signal can be an optical pulse (non-coded sensing) or a desired code sequence (for coded case), wherein each location along the length of the fiber reflects a small portion of the optical interrogation signal. The reflected signal carries information that the interrogator senses. In contemporary systems, an optical detector may employ—for example—a direct detection or coherent detection scheme. Note that the optical LO is an optical signal produced by a local laser source for coherent detection, and a synchronization signal from the signal source is used to indicate a starting location.

Operationally, signals resulting from Rayleigh backscattering exhibits a phase change that is linear to a vibration or stretch level experienced by the sensing optical fiber. A coherent detector followed by corresponding signal processing is able to extract the phase change, thus able to fully recover the vibration or stretch. Such operation is usually used to detect a vibration of an acoustic frequency. Note that an upper limit of the detecting frequency is determined by the optical pulse or code repetition rate—which in turn is limited by optical fiber length. For example, a 5 km fiber limits the repetition rate to not exceed 20 kHz, which results in a 10 kHz upper limit of detectable acoustic frequency. We note that a Rayleigh backscattered signal also exhibits an amplitude change caused by a vibration/disturbance to the optical fiber, though the response may not be linear. A direct detection optical receiver can be used to detect the amplitude change and therefore may be used in a system to monitor the vibration, which is known in the art as distributed vibration sensing (DVS).

As noted previously, we previously reported an approach in which one or more point sensors were located along a length of sensing fiber—generally where needed according to application. Such sensors generated an acoustic frequency signal which carried sensory information back to the interrogator. The interrogator subsequently extracted the acoustic signal, decoded the signal to recover an original message, and associated that message with the specific point sensor along the fiber.

Figure 2:
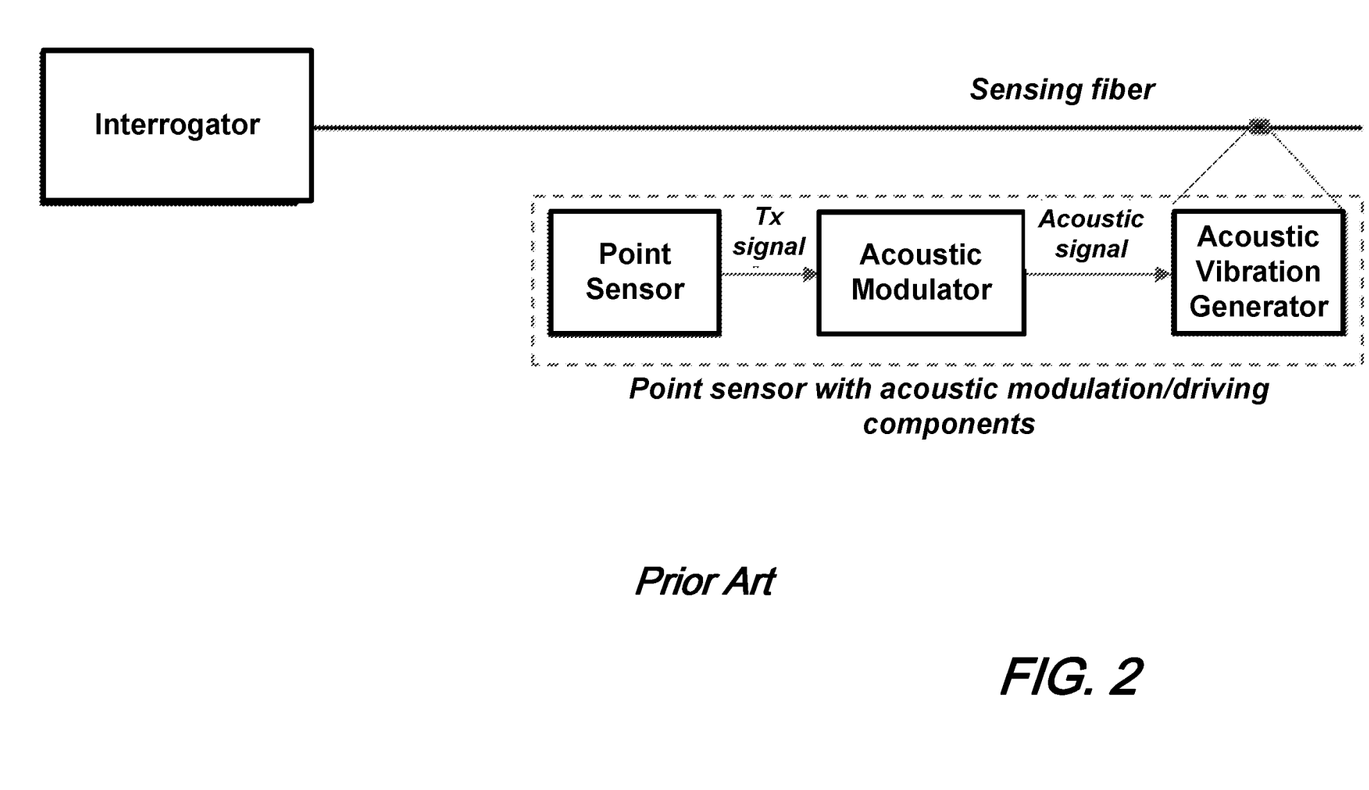
FIG. 2 is a schematic diagram illustrating a DFOS system including a point sensor using modulated acoustic signal to convey information to interrogator according to aspects of the present disclosure.

Advantageously, and as will be readily appreciated by those skilled in the art, point sensors employed can be any of a variety of types, for example a weather station, a gas sensor, or even a camera—or combinations thereof. In one embodiment, the point sensor includes a modulator which modulates sensed data or results into an acoustic frequency within the fiber sensing range. The modulator's output drives a vibration generating device which converts an electrical signal into mechanical vibrations, such as a speaker or other components, that in turn stimulates the optical fiber. This is illustratively shown in FIG. 2 which is a schematic diagram illustrating a DFOS system including a point sensor using modulated acoustic signal to convey information to interrogator according to aspects of the present disclosure.

Figure 3:
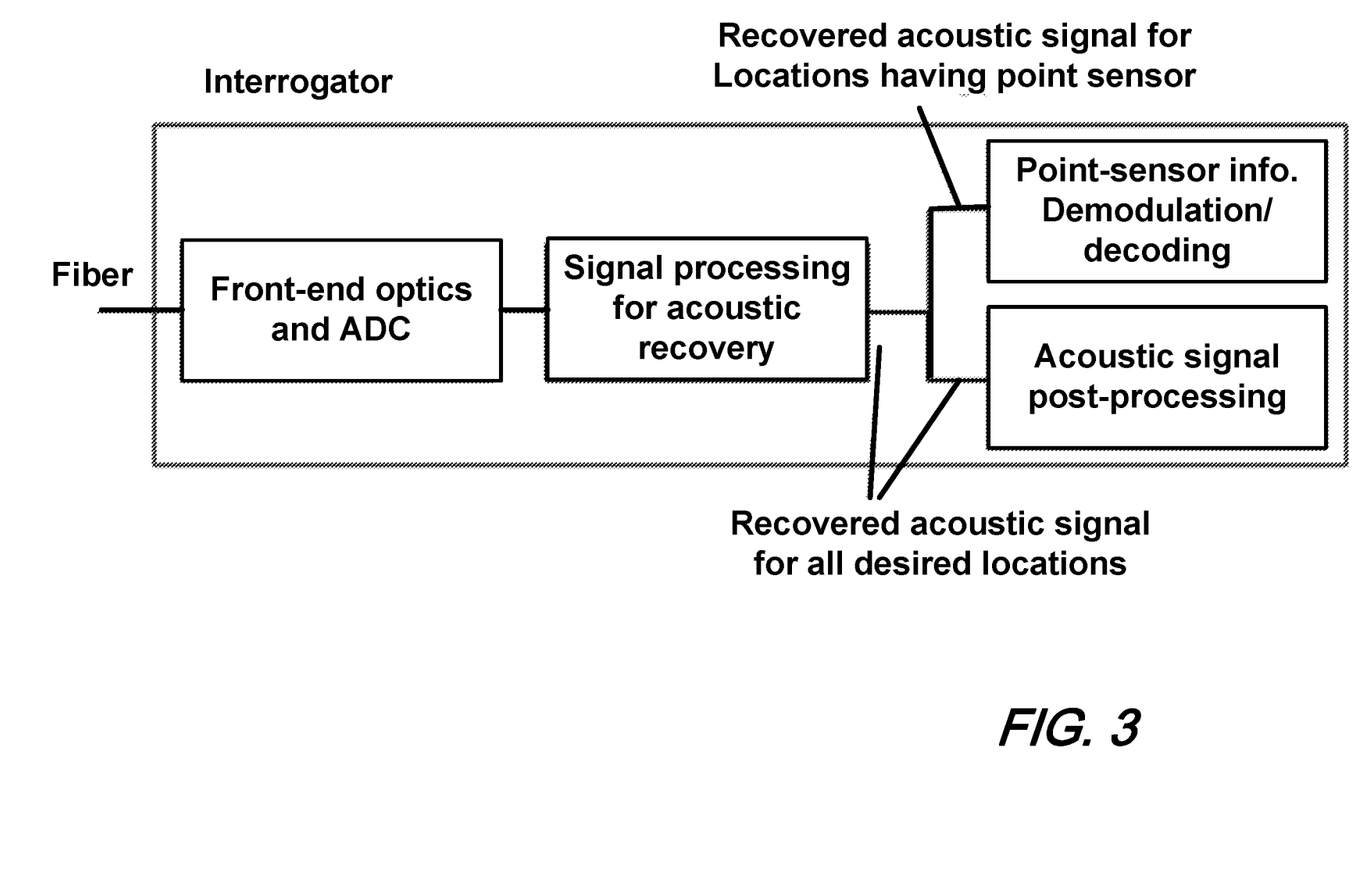
FIG. 3 is a schematic diagram illustrating demodulation/decoding from a fully recovered distributed acoustic sensing (DAS)/distributed vibration sensing (DVS) signal according to aspects of the present disclosure.

Operationally, the interrogator uses a substantially same pre-processing procedure as DAS/DVS processing, and extracts the acoustic/vibration signal (linear or non-linear) of pulse or code repetition frequency. The signal is further processed for application-specific purpose, such as vibration detection. In addition, for signals from locations of the point sensors, they are also passed to a demodulator for data recovery. This is illustratively shown in FIG. 3 which is a schematic diagram illustrating demodulation/decoding from a fully recovered distributed acoustic sensing (DAS)/distributed vibration sensing (DVS) signal according to aspects of the present disclosure.

With this extended discussion in place, we now note that systems, methods, and structures according to aspects of the present disclosure advantageously employ two levels of processing inside the interrogator: coarse level vibration detection, and fine level demodulation.

Coarse processing uses the vibration detection feature, which typically has the procedure of filtering to suppress noise and/or DC elements, and a power accumulator to enhance the signal while reduce the output rate. Fine level demodulation is processing the signal of a location sample-by-sample, using corresponding demodulation scheme (such as frequency, phase, amplitude, and so on) to recover the data sent from a point sensor. Here "sample" refers to one sample for the specific location, which has the rate of pulse or code repetition frequency. Fine level demodulation is only invoked if there is vibration detected from coarse processing.

Figure 4:
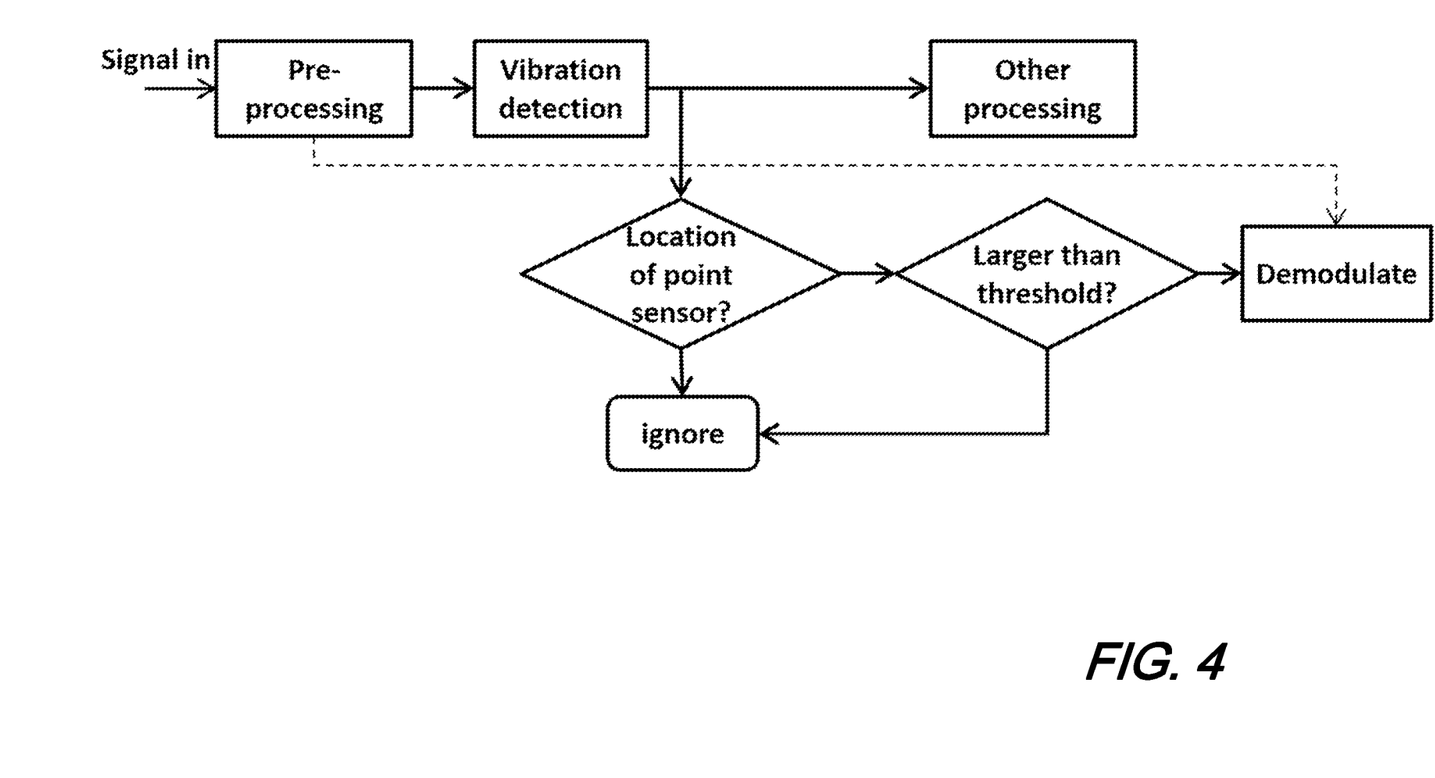
FIG. 4 is a flow diagram of in illustrative method according to aspects of the present disclosure.

In one example system, vibration is detected using FPGA firmware or an ASIC. The output is a level of vibration for a given period, for each location (in terms of the system's spatial resolution). For vibration output from locations of the point sensors, a thresholder is used to determine whether further demodulation is needed. If the vibration is above a pre-determined threshold, prior-vibration-detection samples from that location are sent to the demodulator for demodulation. Advantageously, such demodulation can be performed in software, or software plus hardware/firmware accelerator, or hardware/firmware only, all executing on a processor. This procedure is illustratively shown in FIG. 4 is a flow diagram of in illustrative method according to aspects of the present disclosure.

Figure 5:
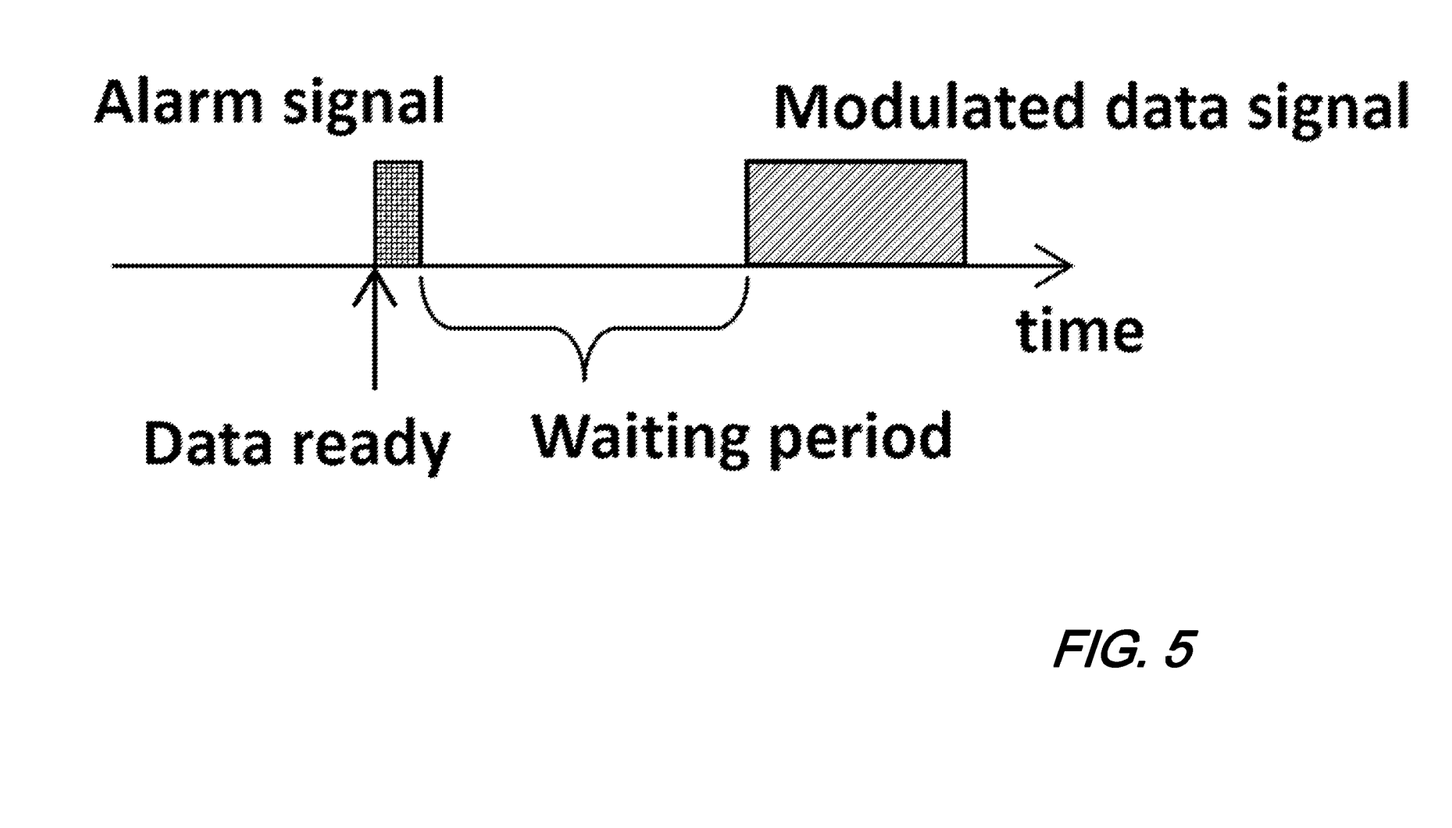
FIG. 5 is a schematic diagram illustrating a signal outputting sequence at a point sensor according to aspects of the present disclosure.

In one illustrative approach according to aspects of the present disclosure once there is data to send, a point sensor uses two stages of operation such as is illustratively shown in FIG. 5 which is a schematic diagram illustrating a signal outputting sequence at a point sensor according to aspects of the present disclosure. with reference to that figure, it may be observed that the first stage is outputting an alarm signal, to allow the interrogator to get ready for processing, and the second stage is for modulated data. Note that an illustrative alarm signal may use a specific frequency or pattern that produces a maximum response at the interrogator's vibration output. The duration can be the fraction or multiple of one vibration result period, depending on the detection sensitivity and/or required detection confidence. In one example, the point sensors closer to the interrogator can have shorter alarm signal than those farther away. In between the alarm stage and the modulated data stage is the waiting period, which is set to the interrogator's maximum latency from the end of the alarm signal to the state ready for demodulation.

With the above signal sequence, once the interrogator detects the alarm from a point sensor (i.e., the vibration output from that location is higher than pre-set threshold), it passes pre-processor output signal from that location to the demodulator, to get the point sensor's data.

Figure 6:
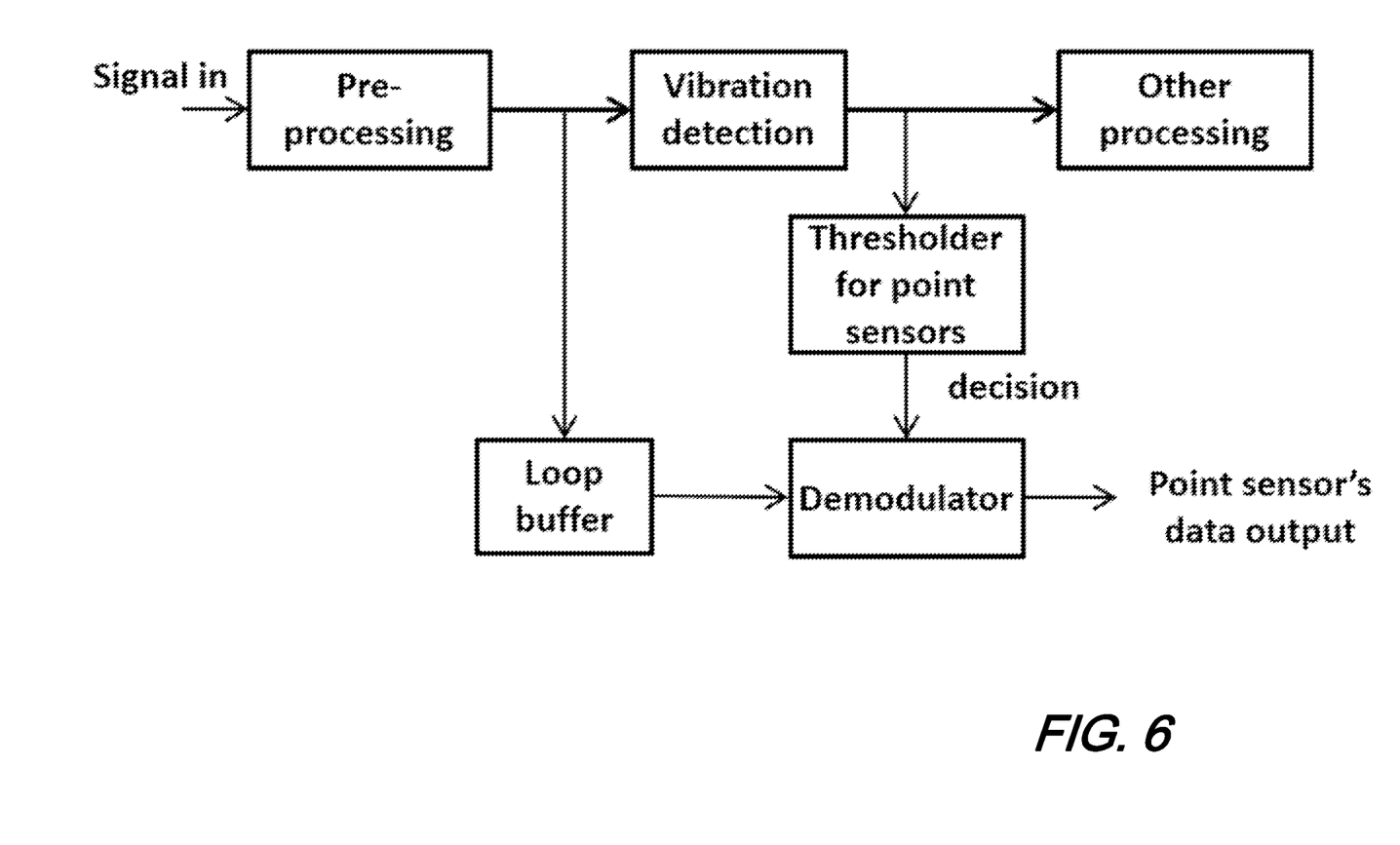
FIG. 6 is a flow diagram of in illustrative method according to aspects of the present disclosure.

In yet another approach according to aspects of the present disclosure, a point sensor may send data whenever needed. In operation, a vibration is detected through a data signal. The interrogator uses the same signal for both vibration detection and demodulation. Operationally, the interrogator employs a loop buffer for each point sensor. While data is input to the vibration detector, data from the point sensor(s) are also written into a corresponding loop buffer. The buffer size for each point sensor is able to compensate the vibration detection and demodulation latency. Once vibration from a point sensor is detected, the samples in its loop buffer are read and used for demodulation. Subsequent samples can be written into the loop buffer then read, or directly input into the demodulator. The block diagram of such operation is illustratively shown in is shown in FIG. 6, which is a flow diagram of in illustrative method according to aspects of the present disclosure.

Advantageously, the loop buffer can be part of dedicated hardware, for example pre-allocated from on-chip memory or external memory (such as SDRAM or SRAM) that is managed by FPGA firmware or ASIC, or allocated and managed by software sharing the software's SDRAM.

Figure 7:
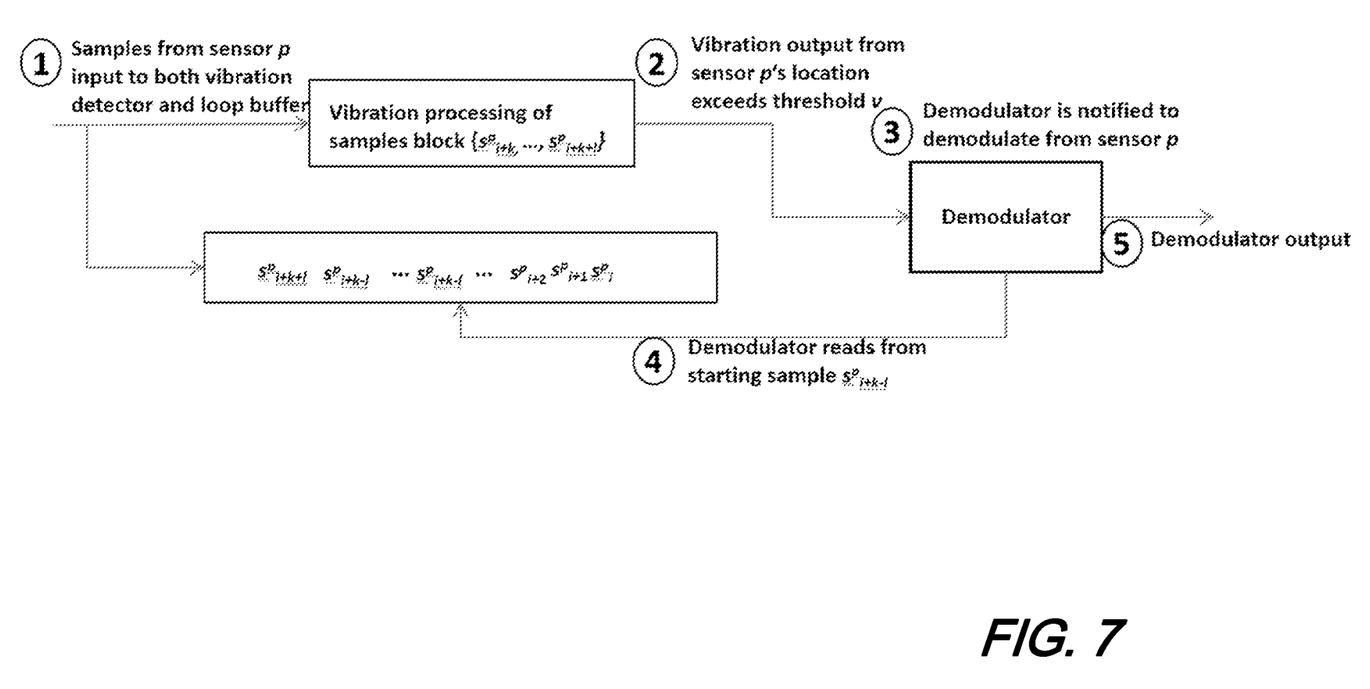
FIG. 7 is a schematic block/flow diagram of an illustrative method according to aspects of the present disclosure.

FIG. 7 is a schematic block/flow diagram of an illustrative method according to aspects of the present disclosure. In the detailed procedure as given in FIG. 7, for samples from point sensor p's location, $(s\hat{\ }p)i$, $(s\hat{\ }p)i+1$, $(s\hat{\ }p)i+2$, . . . , are inputted into the vibration detector, and written into sensor p's loop buffer at the same time. Assume the vibration detector uses/samples from each location as a block to generate one output. From the vibration processing of sample block $\{(s\hat{\ }p)i+k, \ldots, (s\hat{\ }p)i+k+l\}$, the output value exceeds threshold v, then the demodulator is notified to read samples from the loop buffer. There is possibility that there are several data samples fall into the previous vibration processing block, yet not reach threshold v (for example, only 2 data samples versus a 10-sample vibration processing block which is not strong enough), so the demodulator needs to read from those that fall in previous vibration processing block. To make it simple, the demodulator reads from sample $(s\hat{\ }p)i+k+l\}$.

The solution includes a DAS or DVS interrogator, its associated sensing fiber, and point sensors that attached to the fiber. The point sensors use acoustic or vibration modulation to convert its sensed data to signal that can be detected by the interrogator, through the optical sensing signal inside the fiber. In terms of this communication, a point sensor works as the transmitter, while the interrogator works as the receiver, so it is unidirectional.

The interrogator uses vibration detection mechanism to monitor whether there is activity from the point sensors. The vibration detector may include filter and power accumulator, that outputs activity in coarse level. The detection output is connected to a thresholder, which tells the demodulator whether to demodulate signal from a point sensor or not. If the vibration is above a threshold, the demodulator will take samples belonging to that point sensor and run demodulation, which we call fine level processing.

The transmitter may provide alarm signal before sending valid data. The alarm signal is selected to have the optimum response at the interrogator's vibration detector. Upon receiving the alarm signal, i.e., detecting a valid vibration from a point sensor, the interrogator sets its demodulator to receive samples from that point sensor and starts demodulation. The transmitter has a waiting period between alarm signal and valid data, to accommodate the receiver's handling delay.

Alternatively, a transmitter does not have an alarm stage. It sends out data whenever needed. Inside the interrogator there is a loop buffer for each transmitter. Each received sample from a point sensor is handled by the vibration detector and written into the loop buffer at the same time. When there is vibration detected, the demodulator is notified to read from the loop buffer and run demodulation.

Figure 8:
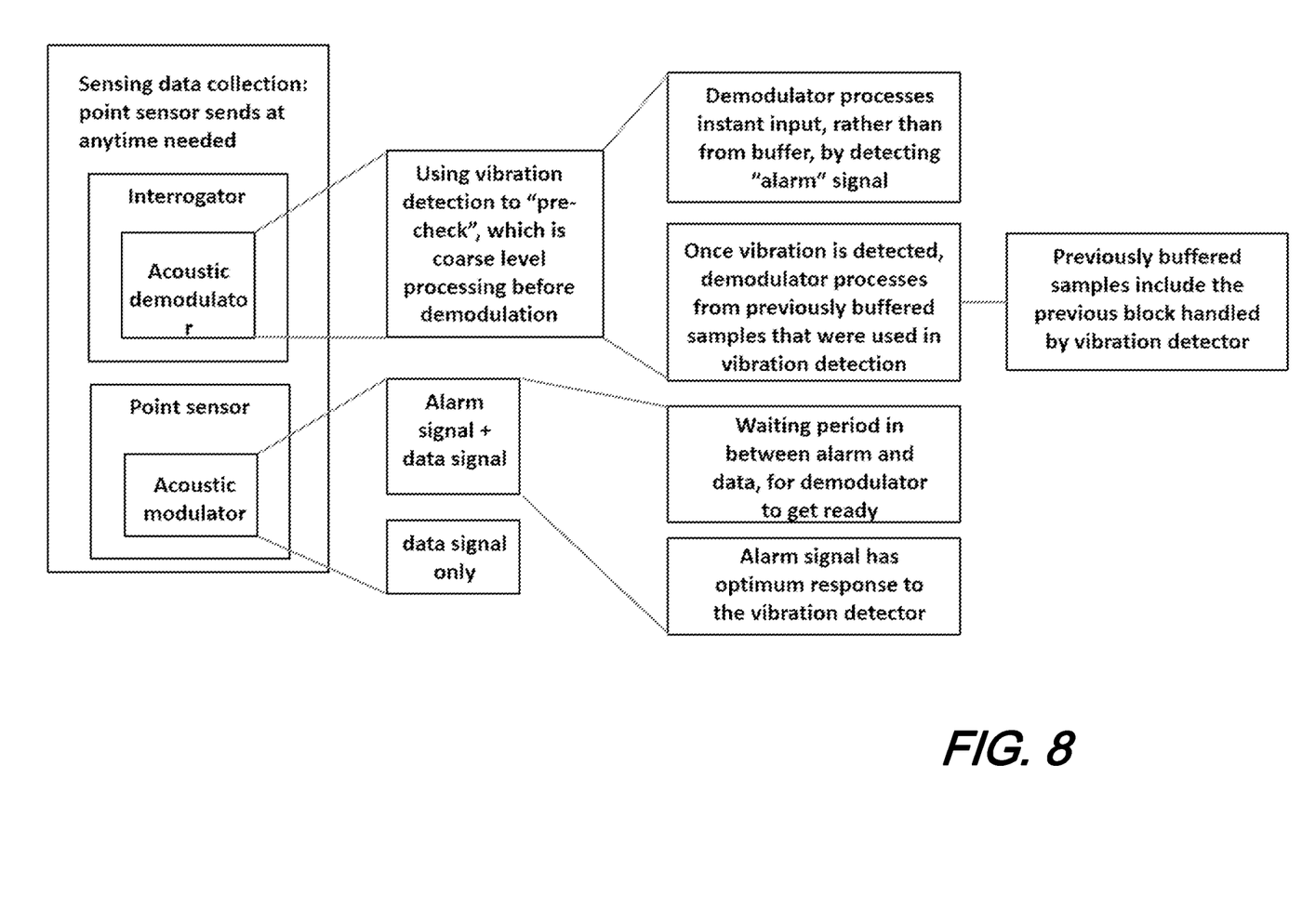
FIG. 8 is a schematic block/flow diagram of an overall illustrative method according to aspects of the present disclosure.

FIG. 8 is a schematic block/flow diagram of an overall illustrative method according to aspects of the present disclosure.

At this point, while we have presented this disclosure using some specific examples, those skilled in the art will recognize that our teachings are not so limited. Accordingly, this disclosure should only be limited by the scope of the claims attached hereto.

The invention claimed is:

1. An optical fiber sensing system comprising:
a length of optical fiber cable;
a fiber sensor interrogator in optical communication with the optical fiber, wherein said interrogator applies interrogation signals to the optical fiber and receives reflected/backscattered signals and generates data indicative of those received signals interrogator system with the length of optical fiber cable;
one or more point sensor elements positioned proximate to the optical fiber, said point sensor elements including a sensor that senses an environmental condition and produces a signal indicative of that sensing;
a modulator that modulates the indicative signal onto an acoustic signal;
wherein the interrogator is configured to provide a vibration detection state and point sensor signal demodulation state;
wherein the vibration detection state detects an abstracted vibration data/signal that is processed from the original, received signals; and
the point sensor demodulation state processes signals from the point sensor elements in a sample-by-sample manner to extract coded information; and
the interrogator uses the abstracted vibration data to determine whether there is a signal from a point sensor or not, and whether to enter demodulation state.

2. The optical fiber sensing system according to claim 1 wherein the point sensor generates an alarm signal for the interrogator to allow the interrogator to get ready for processing before sending modulated data such that the interrogator enters a demodulation mode upon detection of the alarm signal, before modulated data is sent.

3. The optical fiber sensing system according to claim 1, wherein the point sensor generates and send modulated data whenever it has information to send, without alarm signal, the interrogator detects a vibration from the modulated data; and the interrogator includes a buffer to buffer and delay sample data for the duration of a vibration decision period and once a vibration detected, the interrogator demodulates the sample data buffered in the buffer.

\* \* \* \* \*